United States Patent
Bauch et al.

(10) Patent No.: US 9,902,309 B2
(45) Date of Patent: Feb. 27, 2018

(54) VEHICLE AND METHOD FOR ILLUMINATING A REGION REARWARD OF A VEHICLE

(71) Applicant: Audi AG, Ingolstadt (DE)

(72) Inventors: Stefan Bauch, Etting (DE); Carsten Singer, Vohburg (DE)

(73) Assignee: AUDI AG, Ingolstadt (DE)

(*) Notice: Subject to any disclaimer, the term of this patent is extended or adjusted under 35 U.S.C. 154(b) by 72 days.

(21) Appl. No.: 15/028,908

(22) PCT Filed: Sep. 20, 2014

(86) PCT No.: PCT/EP2014/002555
§ 371 (c)(1),
(2) Date: Apr. 12, 2016

(87) PCT Pub. No.: WO2015/055273
PCT Pub. Date: Apr. 23, 2015

(65) Prior Publication Data
US 2016/0257242 A1   Sep. 8, 2016

(30) Foreign Application Priority Data
Oct. 16, 2013   (DE) .................... 10 2013 017 213

(51) Int. Cl.
*B60Q 1/22* (2006.01)
*B60Q 1/44* (2006.01)
(Continued)

(52) U.S. Cl.
CPC ................ *B60Q 1/22* (2013.01); *B60Q 1/44* (2013.01); *B60T 8/17* (2013.01); *B60T 17/22* (2013.01);
(Continued)

(58) Field of Classification Search
CPC .... B60Q 1/22; B60Q 1/44; B60Q 1/56; B60T 8/17; B60T 17/22; B60T 2201/10;
(Continued)

(56) References Cited

U.S. PATENT DOCUMENTS 6,476,730 B2 * 11/2002 Kakinami .............. B60Q 9/005
340/435
8,718,892 B2   5/2014 Dietzel et al.
(Continued)

FOREIGN PATENT DOCUMENTS

CN          2630083 Y      8/2004
CN        202557518 U     11/2012
(Continued)

OTHER PUBLICATIONS

International Preliminary Report on Patentability directed to related International Patent Application No. PCT/EP2014/002555, with attached English-language translation, dated Dec. 14, 2015; 12 pages.
(Continued)

*Primary Examiner* — Michael J Zanelli
(74) *Attorney, Agent, or Firm* — Sterne, Kessler, Goldstein & Fox P.L.L.C.

(57) ABSTRACT

The present disclosure describes a vehicle and a method for illuminating a region rearward of a vehicle. The vehicle comprises a braking system for braking the vehicle, a reverse gear for starting to drive the vehicle (10) in reverse, and a sensor for detecting an engaged reverse gear. Furthermore, a brake activating device connected to the sensor is provided, wherein the brake activating device activates the braking system automatically once the sensor has detected an engaged reverse gear, and wherein when the braking system is activated, at least one brake light of the vehicle can be switched on by means of a light switch-on device.

17 Claims, 1 Drawing Sheet

(51) Int. Cl.
*B60W 30/18* (2012.01)
*B60T 17/22* (2006.01)
*B60T 8/17* (2006.01)
*B60Q 1/56* (2006.01)

(52) U.S. Cl.
CPC ............ *B60Q 1/56* (2013.01); *B60T 2201/10* (2013.01); *B60T 2230/08* (2013.01); *B60W 30/18036* (2013.01); *B60W 2710/182* (2013.01)

(58) Field of Classification Search
CPC ......... B60T 2230/08; B60W 2710/182; B60W 30/18036
See application file for complete search history.

(56) References Cited

U.S. PATENT DOCUMENTS

| | | | |
|---|---|---|---|
| 8,972,142 | B2 | 3/2015 | Takagi et al. |
| 9,387,841 | B2 | 7/2016 | Beever et al. |
| 2004/0032324 | A1 | 2/2004 | Otani |
| 2004/0130902 | A1 | 7/2004 | Snyder et al. |
| 2012/0256544 | A1 | 10/2012 | Salmen et al. |

FOREIGN PATENT DOCUMENTS

| | | |
|---|---|---|
| CN | 103118909 A | 5/2013 |
| CN | 103298666 A | 9/2013 |
| DE | 102005003191 A1 | 7/2006 |
| DE | 102010033416 A1 | 2/2012 |
| DE | 102011000358 A1 | 8/2012 |
| GB | 2483719 A | 3/2012 |
| WO | WO 90/12711 A1 | 11/1990 |
| WO | WO2012095715 A2 | 7/2012 |

OTHER PUBLICATIONS

International Search Report directed to related International Patent Application No. PCT/EP2014/002555, with attached English-language translation, dated Feb. 9, 2015; 7 pages.
English-language abstract of German Patent Publication No. 10 2005 003 191 A1, published Jul. 27, 2006; 1 page.
English-language abstract of Chinese Patent Application Publication No. 202557518 U, published Nov. 28, 2012; 1 page.
English-language abstract of Chinese Patent Application Publication No. 2630083 Y, published Aug. 4, 2004; 1 page.

* cited by examiner

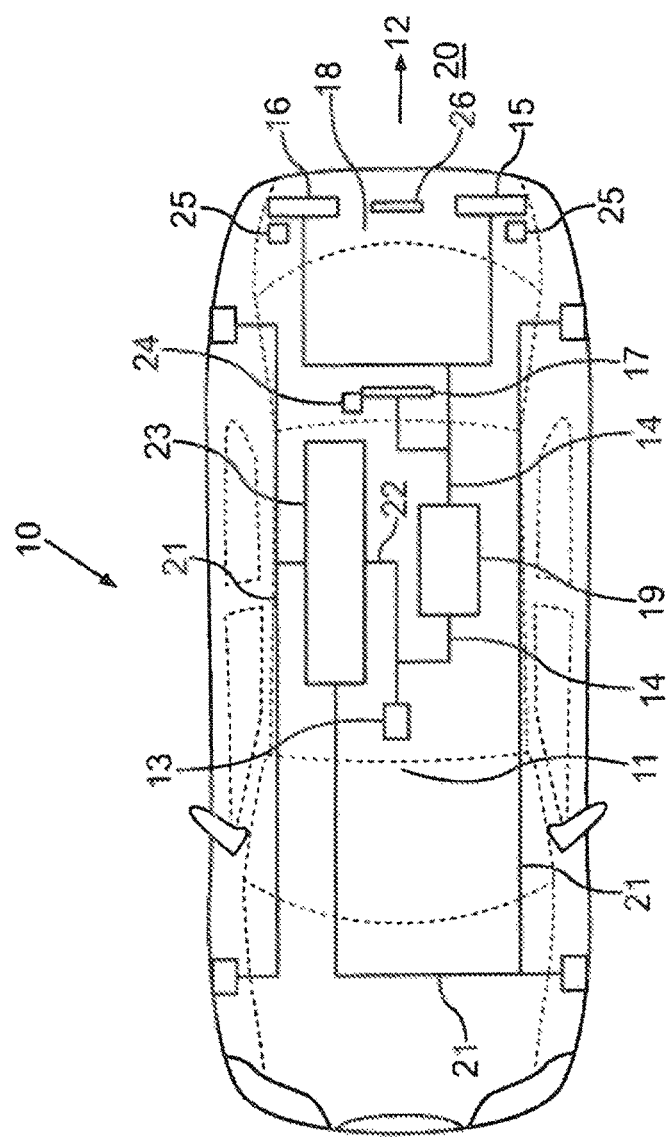

VEHICLE AND METHOD FOR ILLUMINATING A REGION REARWARD OF A VEHICLE

TECHNICAL FIELD

The invention relates to a vehicle and a method for illuminating a region rearward of a vehicle.

BACKGROUND

Vehicles today are increasingly being equipped with a device for detecting the environment surrounding them. With such devices, the surroundings of the vehicle are detected via optical means, for example to identify permanently installed objects or objects in motion as obstacles when driving or parking. Monitoring a blind spot is another possible use for an environment detection device.

Document DE 10 2005 003 191 A1 describes a device for environment detection in detail. The device has a light source, a camera and an evaluation unit, and enables both obstacle detection and a detection of the distance to the obstacle. Among other things, the device can be used to illuminate a region rearward of the vehicle and then enable the acquisition of an image of the region rearward of the vehicle.

One use of an environment detection system is based on the need to detect obstacles when the vehicle is traveling in reverse. The area behind the vehicle is known to be illuminated when a reverse gear is engaged, by the backup lights in the tail lights, and possibly by the license plate lights emitting scattered light. However, with current configurations, especially based on the design that is used, backup lights are tending to be smaller, and as a result, they provide only a small amount of light at the rear of the vehicle. For vehicles that are equipped with camera systems, providing sufficient illumination is a problem. In most vehicles that have an installed backup camera, the amount of light provided is frequently no longer adequate for recording images of sufficient quality. As a consequence, persons and/or objects behind the vehicle cannot be detected, or not in time, especially when a camera is being used.

BRIEF DESCRIPTION OF THE DRAWINGS/FIGURES

FIG. 1 illustrates a vehicle configured to illuminate a region rearward of the vehicle.

DETAILED DESCRIPTION

It is therefore the object of the invention to provide a solution with which the illumination of the area behind a vehicle can be improved in a simple way.

This object is attained by a vehicle which has a braking system for braking the vehicle, a reverse gear for initiating reverse travel of the vehicle, and a sensor for detecting when a reverse gear has been engaged. Additionally, a brake activation device is provided, which is connected to the sensor, wherein the brake activation device automatically activates the braking system as soon as the sensor detects the engagement of a reverse gear, and wherein, when the braking system is activated, at least one brake light of the vehicle can be switched on via a light activation device.

The object of the invention is further attained by a method for illuminating an area behind a vehicle, in which provision is made for detecting the engagement of a reverse gear, automatically activating a braking system of the vehicle, and activating a brake light of the vehicle.

In this way, provision is made that by engaging a reverse gear, at least one brake light, and preferably all the brake lights installed in the vehicle, are activated or switched on. This automatically means that the driver is not applying the brake at all, but rather automatic braking is initiated by the brake activation device, which is a brake control device, for example. To detect the engagement of a reverse gear, a sensor is installed in the vehicle, which operates electronically, for example, and monitors the transmission of the vehicle, for example. Overall, merely by engaging a reverse gear, one or more brake lights of the vehicle is activated, thereby providing improved illumination of an area behind the vehicle, i.e. an area outside the vehicle, in a simple way.

The brake lights at the rear of the vehicle can be aligned so as to illuminate an area outside the vehicle, especially the area behind the vehicle. Thus the brake lights, in addition to the installed backup light or lights, are suited for better illuminating the area behind the vehicle. With this procedure, no additional installations are necessary, since the brake lights are already provided in the vehicle for signaling a braking action. The additional activation of one or more brake lights when the reverse gear is engaged offers added vehicle safety, as this signals that the vehicle will soon be traveling in reverse, or that reverse travel may be imminent. The driver need not undertake any additional signaling, because by engaging the reverse gear, the braking system is automatically or independently activated by a brake activation device, and the activation of the braking system in turn causes one or more brake lights to switch on due to the action of a light activation device on at least one brake light. For activation of the braking system, a sensor is used which detects the engagement of the reverse gear and signals the brake activation device to activate the braking system. With this procedure, no additional installations are needed in terms of lighting devices, since the brake lights are already provided in the vehicle for signaling a braking action during regular brake operation. The light activation device may also be used to switch on a plurality of brake lights. This increases the illumination power overall, since the light cones of the individual brake lights can overlap when suitably aligned.

In one invention-specific embodiment, provision can be made that the brake activation device is a first control device which connects the sensor to the braking system. Additionally, provision can be made that the light activation device is a second control device which is connected to the brake activation device: Additional control devices are also possible, which participate in activating a brake light when the reverse gear is engaged. An operative connection may be provided between the sensor and one or more control devices.

The sensor can be connected via the brake activation device to the braking system of the vehicle. Additionally, the sensor can be connected via the light activation device to the brake light. The brake activation device and/or the light activation device can be in direct contact with the sensor or can integrate the sensor. Thus, via one or more coupling connections, the sensor can be connected to the first and/or second control device. Each control device can generate an activation command or a signal, which initiates the activation of the braking system and simultaneously or subsequently initiates one or more activations of the brake lights. The coupling connection can be an electrical connection, a hydraulic connection or some other suitable type of connection between the installed sensor in the vehicle and the installed control device in the vehicle. Various embodiments of a sensor may be used, for example sensors that operate optically, acoustically, electrically or hydraulically. A hydraulic sensor has the advantage that it can be installed directly in a braking system of the vehicle without requiring a transformation of the signal in order to activate the braking system with the brake light.

In one invention-specific embodiment, provision can be made for an increased braking pressure to be set automatically via the brake activation device. By using hydraulic means to increase braking pressure, an area behind the vehicle can be illuminated. In this case a brake control device acts directly on the braking system of the vehicle. For example, when engagement of the reverse gear is detected by the installed sensor, the braking pressure can be increased slightly, thereby activating the brake lights. The brake light stays activated for as long as the braking pressure exceeds a threshold that activates illumination of the brake light. When the braking pressure is then decreased and drops below a predefined threshold, the brake light is switched back off. This occurs as soon as the reverse gear is no longer engaged.

In another embodiment, provision can be made that the brake activation device is part of an illumination device, and that the brake light can be switched on indirectly via the brake activation device by first activating the braking system, causing the lighting system to be activated.

This means that the sensor advantageously operates electrically, and in this way detects the engagement of a reverse gear so as to act directly on the illumination device. The sensor may detect a change in electrical capacitance, for example. In this embodiment, the sensor can act directly on a control device, without involving the braking system. This means that merely by engaging the reverse gear, the brake light is activated electrically without involving the hydraulic system of the braking system.

Additionally, provision can advantageously be made that with an activated brake light, an area behind the vehicle can be illuminated to supplement the illumination from an activated backup light. In this way, multiple lights are activated simultaneously to increase illumination at the rear area of the vehicle.

In a preferred embodiment, provision can be made that with an activated brake light, the area behind the vehicle can be illuminated to supplement the illumination from an activated license plate light. Since the light on the license plate of the vehicle is likely to be found in a lower rear area of the vehicle, there can be increased illumination of a lower area behind the vehicle.

According to one embodiment, the invention-specific vehicle can have a camera, the visual field of which is directed to the area behind the vehicle, and the activated brake light can be used for illuminating the visual field of the camera. The camera can therefore be aligned to match the light conditions when the brake lights are activated. It is also possible to mount the camera so as to pivot, so that pivoting can be coordinated with the activation of one or more brake lights. If, for example, only the driver's side brake light is activated by the control device, then the camera can be directed into the light cone of that brake light. Through targeted direction, better contrast of acquired images can be obtained, for example. The camera images may be static images, i.e. snapshots, or also video, depending on the design of the camera. These images can then be provided to the driver in the cockpit, without the driver needing to direct his view toward the rear area of the vehicle.

Preferably, in one invention-specific embodiment, provision can be made that braking pressure can be increased to activate the brake light without the driver activating the brake pedal of the vehicle. Therefore, braking pressure can be increased without the driver being involved. The driver of the vehicle can trigger increased braking pressure merely by engaging the reverse gear.

Additionally, in one preferred embodiment of the invention, the brake light is a brake light elevated above the other brake lights. In this embodiment, the upper areas behind the vehicle can be illuminated. This can be provided in addition to or alternatively to one or more previous brake lights, which are situated in the area of further lights, for example a backup light or a directional signal.

In what follows, an embodiment of the invention is explained in reference to FIG. 1.

FIG. 1 shows a vehicle 10, which has a transmission having a reverse gear 11 for reverse travel of vehicle 10, in the direction 12 indicated. What is understood here by transmission is any suitable transmission that is used in vehicles, for example a manual transmission or an automatic transmission.

Vehicle 10 further has a sensor 13 for detecting the engagement of reverse gear 11. Vehicle 10 also has a coupling connection for coupling the sensor to at least one brake light 15, 16, 17 of vehicle 10. In the present embodiment, the vehicle has a first and a second brake light 15, 16 at the level of a trunk lid 18, and an additional third brake light 17, which is situated above the first and second brake lights 15, 16 and can be understood to be the high-level brake light. Additionally, the vehicle has a light activation device 19, which is directly connected to each of the brake lights 15, 16, 17 via an operative connection 14. Light activation device 19 is configured in this case as a BCM2 device, and is therefore configured as a control device of the illumination device. Light activation device 19 or the control device activates brake lights 15, 16, 17 as soon as sensor 13 detects the engagement of reverse gear 11.

When engagement of the reverse gear is detected, the illumination becomes more intense in an area 20 behind vehicle 10 due to the activation of brake lights 15, 16, 17. For this purpose, braking pressure is built up in a braking system 21 installed in vehicle 10. This is accomplished in that sensor 13 is connected to a brake activation device 23 of braking system 21, and brake activation device 23 increases braking pressure in the hydraulic lines of braking system 21, causing brake lights 15, 16, 17 to light up. In this process, the control device of brake activation device 23 communicates with the control device of light activation device 19. The braking pressure in braking system 21 is increased by the engagement of reverse gear 11. It is not necessary for this that the driver press the brake pedal in vehicle 10. Owing to the increased pressure in braking system 21, rearward area 20 behind vehicle 10 is given additional illumination by high-level brake light 17 and by the brake lights in tail lights 15, 16. This can also be optimized such that illumination behind vehicle 10 is further enhanced.

In other words, when the selector lever in an automatic transmission is set to reverse gear 11 or when a manual transmission is placed in reverse gear 11, this is detected by sensor 13. This information is made available to the brake activation device or to a control device 23 of the braking system, which slightly increases the braking pressure in braking system 21. The increase in braking pressure is comparable to an increase in braking pressure in an ABS application or a dry run function. The information regarding the engaged reverse gear 11 is also made available to BCM2

19 or to the control device 19 responsible for illumination, which switches on brake lights 15, 16 and higher-level brake light 17.

When brake lights 15, 16, 17 are activated, area 20 behind vehicle 10 can therefore be provided with illumination to supplement the illumination from an activated backup light 25 and/or an activated license plate light 26. This means that the brake lights can be activated individually or jointly to bring defined illumination to rear area 20 outside the vehicle 10, in order to obtain images that are richer in contrast by means of camera 24, for example. This also offers the advantage that the installed backup camera 24 is able to provide better images due to the improved illumination behind vehicle 10. Occupants of the vehicle, especially the driver of the vehicle, can detect objects and persons in the camera image more quickly. This results in increased passive safety of vehicle 10.

The invention claimed is:

1. A vehicle comprising:
    a braking system configured to brake the vehicle;
    a reverse gear configured to initiate reverse travel of the vehicle;
    a sensor configured to detect an engagement of the reverse gear;
    a brake activation device configured to automatically activate the braking system, without activation of a brake pedal of the vehicle, based on the sensor detecting the engagement of the reverse gear;
    a brake light configured to be switched on, via a light activation device, based on the brake activation device automatically activating the braking system.

2. The vehicle of claim 1, wherein the brake activation device is a first control device that connects the sensor to the braking system.

3. The vehicle of claim 1, wherein the light activation device is a second control device that is connected to the brake activation device.

4. The vehicle of claim 1, wherein activating the braking system increases braking pressure in the braking system.

5. The vehicle of claim 1, wherein the brake light is configured to be switched on, via the light activation device, based on the brake activation device automatically activating the braking system to supplement an illumination of an area behind the vehicle by an activated backup light.

6. The vehicle of claim 1, wherein the brake light is configured to be switched on, via the light activation device, based on the brake activation device automatically activating the braking system to supplement an illumination of an area behind the vehicle by an activated license plate light.

7. The vehicle of claim 1, further comprising:
    a camera comprising a visual field directed to an area behind the vehicle,
    wherein the brake light is configured to be switched on, via the light activation device, based on the brake activation device automatically activating the braking system to illuminate the visual field of the camera.

8. The vehicle of claim 1, wherein the brake light is a high-level brake light above a trunk lid of the vehicle.

9. A method for illuminating an area behind a vehicle, the method comprising:
    detecting an engagement of a reverse gear;
    automatically activating a braking system of the vehicle, without activation of a brake pedal of the vehicle, based on detecting the engagement of the reverse gear; and
    activating at least one brake light of the vehicle in response to automatically activating the braking system.

10. The method of claim 9, wherein automatically activating the braking system of the vehicle further comprises:
    increasing braking pressure in the braking system.

11. The method of claim 9, wherein activating the at least one brake light of the vehicle in response to automatically activating the braking system is performed to supplement an illumination of an area behind the vehicle by an activated backup light.

12. The method of claim 9, wherein activating the at least one brake light of the vehicle in response to automatically activating the braking system is performed to supplement an illumination of an area behind the vehicle by an activated license plate light.

13. The method of claim 9, wherein activating the at least one brake light of the vehicle in response to automatically activating the braking system is performed to illuminate a visual field of a camera.

14. A vehicle comprising:
    a camera comprising a visual field directed to an area behind the vehicle,
    a reverse gear configured to initiate reverse travel of the vehicle;
    a sensor configured to detect an engagement of the reverse gear; and
    a brake light configured to be switched on, via a light activation device, based on a brake activation device automatically activating a braking system without activation of a brake pedal of the vehicle,
    wherein the brake activation device automatically activates the braking system without activation of the brake pedal of the vehicle based on the sensor detecting the engagement of the reverse gear to illuminate the visual field of the camera.

15. The vehicle of claim 14, wherein the brake light is a high-level brake light above a trunk lid of the vehicle.

16. The vehicle of claim 14, wherein the brake light is configured to supplement an illumination of the area behind the vehicle by an activated backup light.

17. The vehicle of claim 14, wherein the brake light is configured to supplement an illumination of the area behind the vehicle by a license plate light.

* * * * *